United States Patent
Bar-Erez

(10) Patent No.: US 7,003,997 B2
(45) Date of Patent: Feb. 28, 2006

(54) METHOD AND APPARATUS TO REDUCE DEFORMATION IN SHEETS CUT BY CUTTING TOOL

(75) Inventor: Yosi Bar-Erez, Sirkin (IL)

(73) Assignee: Solidimension Ltd., Beirot Itzhak (IL)

( * ) Notice: Subject to any disclaimer, the term of this patent is extended or adjusted under 35 U.S.C. 154(b) by 67 days.

(21) Appl. No.: 10/471,318

(22) PCT Filed: Apr. 11, 2002

(86) PCT No.: PCT/IL02/00292

§ 371 (c)(1),
(2), (4) Date: Sep. 10, 2003

(87) PCT Pub. No.: WO02/083335

PCT Pub. Date: Oct. 24, 2002

(65) Prior Publication Data

US 2004/0094003 A1     May 20, 2004

Related U.S. Application Data

(60) Provisional application No. 60/282,910, filed on Apr. 11, 2001.

(51) Int. Cl.
B21B 31/18 (2006.01)
B21B 31/20 (2006.01)
B21B 31/22 (2006.01)

(52) U.S. Cl. .............. 72/70; 72/75; 72/324; 72/363; 156/267; 156/268; 156/271; 156/257; 156/512

(58) Field of Classification Search .......... 72/71, 72/72, 363, 186, 324, 325, 75, 479, 476; 409/301, 139, 303, 308, 345, 346; 407/34, 407/41; 29/81.05, 81.03, 82.05; 156/267–271, 156/257, 264, 512
See application file for complete search history.

(56) References Cited

U.S. PATENT DOCUMENTS

| | | | | |
|---|---|---|---|---|
| 60,193 A | * | 12/1866 | Jennings | 72/477 |
| 254,195 A | * | 2/1882 | Brown | 72/479 |
| 304,505 A | * | 9/1884 | Clinch | 72/479 |
| 1,377,537 A | * | 5/1921 | Wimmer | 29/81.05 |
| 1,555,449 A | * | 9/1925 | Blackaby | 69/21 |
| 1,581,699 A | * | 4/1926 | Sturrock | 125/5 |
| 2,575,257 A | * | 11/1951 | Boulware | 428/115 |
| 3,263,665 A | * | 8/1966 | Collins | 125/5 |
| 3,474,655 A | * | 10/1969 | Fulkerson | 72/327 |
| 3,531,350 A | * | 9/1970 | Rausing Hans Anders et al. | 156/244.19 |
| 3,555,644 A | * | 1/1971 | Owen | 407/36 |
| 3,872,705 A | * | 3/1975 | Bair | 72/393 |
| 4,232,075 A | * | 11/1980 | Gantz et al. | 428/124 |

(Continued)

FOREIGN PATENT DOCUMENTS

WO     WO99/34976     7/1999

Primary Examiner—Daniel C. Crane
(74) Attorney, Agent, or Firm—Mark M. Friedman

(57) ABSTRACT

The present invention is a method for reducing the deformation along a cut contour edge (26) of a sheet (2) caused by the cutting process whereby sheet material (4) protrudes above the top surface of the sheet being cut. One group of embodiments (22, 50, 60) apply pressure to the deformation to flatten the protrusion (4). Another group of embodiments (70, 80) cut away ant material protruding above the top surface of the sheet. The deformation reduction mechanisms of both groups may be mechanically linked to the contour-cutting element or they may pass over the line of the contour cut independently.

34 Claims, 14 Drawing Sheets

U.S. PATENT DOCUMENTS

| | | | |
|---|---|---|---|
| 4,357,817 A | * 11/1982 | Linsinger | 72/71 |
| 4,599,125 A | * 7/1986 | Buck | 156/248 |
| 4,672,726 A | * 6/1987 | Delbecq et al. | 29/33 A |
| 5,017,060 A | * 5/1991 | Shiratori et al. | 409/137 |
| 6,254,707 B1 | * 7/2001 | Sfikas et al. | 156/73.3 |

* cited by examiner

METHOD AND APPARATUS TO REDUCE DEFORMATION IN SHEETS CUT BY CUTTING TOOL

This application is a 371 of PCT/IL02/00292, filed Apr. 11, 2002, which claims benefit of Ser. No. 60/282,910, filed Apr. 11, 2001.

FIELD AND BACKGROUND OF THE INVENTION

The present invention relates to the construction of three-dimensional objects made from a stack of cut sheets and, in particular, it concerns reducing the deformation along a cut contour edge of a sheet caused by the cutting process.

Various systems for the construction of three-dimensional objects by stacking layers that represent a "slice" of the object are known and there are various methods and devices for doing so. Many of these systems involve the bonding together of a number of shaped laminations or layers to form the three-dimensional object. Systems such as that disclosed in published patent application WO9934976 first bond a new layer in place and then cut the contour necessary to form that slice of the object being constructed. When the cutting instrument is a blade or other solid element, it has been noted that during the process of cutting the contour, the sheet edges along the new cut may rise or curl. This deformation could reduce the effectiveness of the bonding and may lead to situations that could impair the overall operation of the system.

There is therefore a need for a method and device that will reduce deformation along cut edges. It would be desirable for the deformation to be reduced on each sheet before the next sheet is added to the stack. It would be further desirable for the deformation to be reduced in conjunction with the cutting operation, thereby reducing the time required for reducing the deformation and thus the time required for the entire process of constructing the three-dimensional object.

SUMMARY OF THE INVENTION

The present invention is a method and device for reducing the deformation along a cut contour edge of a sheet caused by the cutting process.

According to the teachings of the present invention there is provided, a method for reducing deformation along a contour cut, the contour cut being in a sheet that is currently the top sheet of a stack of at least partially bonded together cut sheets, the deformation being a result of a cutting process whereby a ridge of sheet material forms along the contour cut, the ridge protruding above a planar top surface of the sheet, the method comprising: moving a contour-cutting element along a contour line so as to make at least one contour cut through at least the top sheet of the stack; and moving a deformation reduction component so as to follow the contour cut after the contour-cutting element has made at least a portion of the contour cut.

According to a further teaching of the present invention, the steps of moving the contour-cutting element and moving the deformation reduction component are performed by the contour-cutting element and the deformation reduction component mechanically linked such that the contour-cutting element and the deformation reduction component are deployed substantially simultaneously.

According to a further teaching of the present invention, the deformation reduction component is biased toward the top surface of the sheet thereby applying pressure to the ridge.

According to a further teaching of the present invention, the applying pressure to the ridge is performed using a deformation reduction component configured as an annular element.

According to a further teaching of the present invention, the steps of moving the contour-cutting element and moving the deformation reduction component are performed by the contour-cutting element and the deformation reduction component mechanically linked such that the annular element substantially circumscribes the contour-cutting element.

According to the teachings of the present invention, there is also provided withdrawing the contour-cutting element to a non-cutting position and continuing movement of the deformation reduction component, thereby passing a portion of the annular element over substantially an entire length of the contour cut.

According to the teachings of the present invention, there is also provided circumscribing the deformation reduction component with an annular stabilization member.

According to a farther teaching of the present invention, the applying pressure to the ridge is preformed using a deformation reduction component configured with a partially spherical pressure application tip.

According to a further teaching of the present invention, the steps of moving the contour-cutting element and moving the deformation reduction component are preformed by the contour-cutting element and the deformation reduction component mechanically linked such that the pressure application tip substantially trails the contour-cutting element with while the contour-cutting element is making the at least one contour cut, thereby moving the pressure application tip along the contour line.

The method of claim 9, further comprising withdrawing the contour-cutting element to a non-cutting position and continuing movement of the deformation reduction component, thereby passing the pressure application tip over substantially an entire length of the contour cut.

According to a further teaching of the present invention, the applying pressure to the ridge is preformed using a deformation reduction component configured as a wheel that rotates about an axis the is substantially parallel to the top surface of the sheet, the wheel being further configured so as swivel about an axis that is substantially perpendicular to the top surface of the sheet.

According to a further teaching of the present invention, the applying pressure to the ridge is preformed using a deformation reduction component configured as an onmidirectional rotating sphere.

According to the teachings of the present invention, there is also provided cutting away portions of the ridge.

According to a further teaching of the present invention, the cutting away is preformed by using the deformation reduction component configured with a blade that revolves substantially constantly about an axis substantially perpendicular to a stacking surface upon which the stack is being constructed, the deformation reduction component having a cutting plane that is substantially parallel to the stacking surface and substantially coincident with the top surface of the sheet.

According to a further teaching of the present invention, the steps of moving the contour-cutting element and moving the deformation reduction component are preformed by the contour-cutting element and the deformation reduction component mechanically linked such that the contour-cutting element is substantially circumscribed by a path of the revolving blade while the contour-cutting element is making the at least one contour cut.

According to the teachings of the present invention, there is also provided withdrawing the contour-cutting element to a non-cutting position and continuing movement of the deformation reduction component, thereby passing the revolving blade over substantially an entire length of the contour cut.

There is also provided according to the teachings of the present invention, a system for bonding together and cutting out portions of a plurality of sheets so as to construct a three-dimensional object, the system including a mechanism for reducing deformation along a contour cut, the contour cut being in a sheet that is currently the top sheet of a stack of at least partially bonded together cut sheets, the deformation being a result of the cutting process whereby a ridge of sheet material forms along the contour cut, the ridge protruding above a planar top surface of the sheet, the system comprising: an apparatus for bonding a portion of an additional sheet to a plurality of sheets so as to form the stack, the apparatus including a stacking surface upon which the stack is assembled, the top surface of the sheet being substantially parallel to the stacking surface; a cutting apparatus configured to move a contour-cutting element along a contour line so as to cut at least one contour cut through at least the top sheet of the stack; and a deformation reduction mechanism configured to move a deformation reduction component along the contour cut after the contour-cutting element has made at least a portion of the contour cut, wherein the deformation reduction component contacts the ridge so as to reduce protrusion of the ridge.

According to a further teaching of the present invention, the deformation reduction mechanism mechanically links the deformation reduction component to the cutting apparatus such that the contour-cutting element and the deformation reduction component are deployed for use and re-deployed for non-use substantially simultaneously.

According to a further teaching of the present invention, the deformation reduction mechanism is configured to bias the deformation reduction component so as to apply pressure to a region of the deformation, thereby depressing the sheet material which forms the ridge toward the surface of the top sheet.

According to a further teaching of the present invention, the deformation reduction mechanism includes a spring configured to bias the deformation reduction component toward the top surface of the sheet.

According to a further teaching of the present invention, the deformation reduction component is at least one substantially annular element.

According to a further teaching of the present invention, the deformation reduction mechanism mechanically links the deformation reduction component to the cutting apparatus such that the contour-cutting element is substantially circumscribed by the at least one substantially annular element.

According to a further teaching of the present invention, the contour-cutting element is mechanically linked to the cutting apparatus so as to be withdrawn to a non-cutting position after completion of the contour cut and movement of the cutting apparatus is continued so as to pass a portion of the deformation reduction component over substantially an entire length of the contour cut.

According to a further teaching of the present invention, the deformation reduction mechanism further includes at least a substantially annular stabilization member which substantially circumscribes the deformation reduction component.

According to a further teaching of the present invention, the deformation reduction component is a tip of a pressure application extension.

According to a further teaching of the present invention, the tip is a substantially spherical element rotatably linked to the pressure application extension so as to rotate omnidirectionally.

According to a further teaching of the present invention, the tip is a wheel that rotates about an axis that is substantially parallel to the top surface of the sheet, the pressure application extension being configured so as rotate about an axis that is substantially perpendicular to the top surface of the sheet.

According to a further teaching of the present invention, the deformation reduction mechanism mechanically links the deformation reduction component to the cutting apparatus such that the pressure application extension trails the contour-cutting element along the contour cut made by the contour-cutting element.

According to a further teaching of the present invention, the contour-cutting element is mechanically linked to the cutting apparatus so as to be withdrawn to a non-cutting position after completion of the contour cut and movement of the cutting apparatus is continued so as to pass the pressure application extension over substantially an entire length of the contour cut.

According to a further teaching of the present invention, the tip is partially spherical.

According to a further teaching of the present invention, the deformation reduction mechanism includes a planing tool configured to cut away portions of the ridge.

According to a further teaching of the present invention, the planing tool is a blade that revolves about an axis substantially perpendicular to the stacking surface, the planing tool having a cutting plane that is substantially parallel to the stacking surface and substantially coincident with the top surface of the sheet.

According to a further teaching of the present invention, the planing tool and the cutting apparatus are mechanically linked such that a path of the revolving blade.

According to a further teaching of the present invention, the contour-cutting element is mechanically linked to the cutting apparatus so as to be withdrawn to a non-cutting position after completion of the contour cut and movement of the deformation reduction mechanism is continued so as to pass the planing tool over substantially an entire length of the contour cut.

There is also provided according to the teachings of the present invention, a device for reducing deformation along a contour cut, the device being associated with a system for bonding together portions of a plurality of sheets, the contour cut being in a sheet that is currently the top sheet of a stack of at least partially bonded together sheets, the deformation being a result of the cutting process whereby a ridge of sheet material forms along the contour cut, the ridge protruding above a planar top surface of the sheet, the device comprising: a deformation reduction mechanism configured to move a substantially annular deformation reduction component substantially along the contour cut after at least a portion of the contour cut has been cut, the deformation reduction component configured to apply substantially downward pressure to the ridge, thereby depressing the sheet material which forms the ridge toward the top surface of the sheet so as to reduce protrusion above the top surface of the sheet According to a further teaching of the present invention, the deformation reduction mechanism includes a spring configured to bias the deformation reduction component toward the top surface of the sheet.

According to a further teaching of the present, invention, the deformation reduction mechanism mechanically links the deformation reduction component to a cutting apparatus such that a contour-cutting element is substantially circumscribed by the at least one substantially annular element.

According to a further teaching of the present invention, the contour-cutting element is mechanically linked to the cutting apparatus so as to be withdrawn to a non-cutting position after completion of the contour cut and movement of the cutting apparatus is continued so as to pass a portion of the at least one substantially annular element over substantially an entire length of the contour cut.

According to a further teaching of the present invention, the deformation reduction mechanism further includes at least a substantially annular stabilization member which substantially circumscribes the deformation reduction component.

There is also provided according to the teachings of the present invention, a device for reducing deformation along a contour cut, the device being associated with system for bonding together portions of a plurality of sheets, the contour cut being in a sheet that is currently the top sheet of a stack of at least partially bonded together sheets, the deformation being a result of the cutting process whereby a ridge of sheet material forms along the contour cut, the ridge protruding above a planar top surface of the sheet, the device comprising: a deformation reduction mechanism configured to move a planing element over the top surface of the sheet, the planing element being of a length substantially equal to a first dimension of the top surface of the sheet, the movement being in a direction of a second dimension of the top surface of the sheet, the first dimension and the second dimension being perpendicular, the planing element having a cutting plane that is substantially parallel to a stacking surface upon which the stack is being constructed and substantially coincident with the top surface of the sheet.

According to a further teaching of the present invention, the planing element is a blade that is fixed in relation to the deformation reduction mechanism.

According to a further teaching of the present invention, the planing element is at least one blade that revolves about an axis substantially perpendicular to the stacking surface.

According to a further teaching of the present invention, the at least one blade is implemented as a plurality of blades.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a method and device for reducing the deformation along a cut contour edge of a sheet caused by the cutting process.

The principles and operation of reducing the deformation along a cut contour edge according to the present invention may be better understood with reference to the drawings and the accompanying description.

By way of introduction, the method and device embodiments discussed herein are especially useful for use with a computerized system that builds three-dimensional objects made of a stack of bonded together sheets cut along a contour by a cutting tool and adhered one of top of the other, such as described in PCT patent application PCT/IL98/00623 published as WO9934976 which is incorporated by reference herein. While this method is useful in the case of cutting plastic sheets, it can be applied to other materials as well.

Building a three-dimensional model made of a stack of bonded together sheets suffers from a number of problems caused by the cutting operation.

Figure 1:
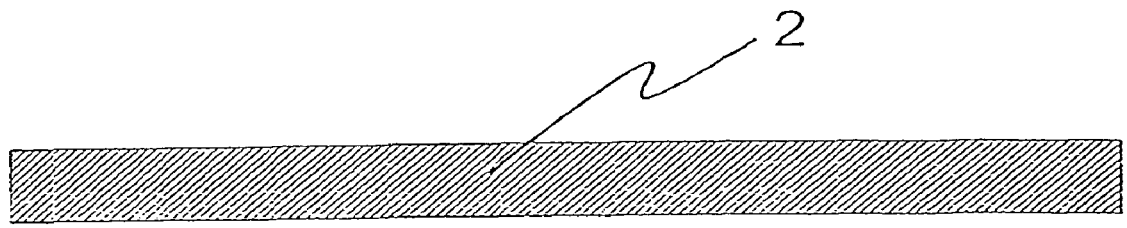
FIG. 1 is a cut-away schematic side view of an uncut sheet.
Figure 2:
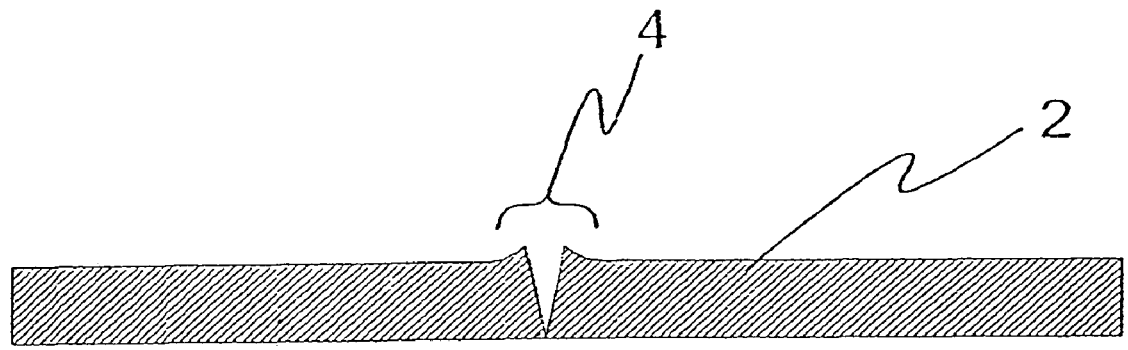
FIG. 2 is a cut-away schematic side view of a sheet, showing a deformation ridge at a contour cut.

Cutting a sheet of material with a cutting element causes a deformation in the edges of the sheet along the cut due to the forces applied by moving the cutting element through the solid material of the sheet. FIG. 1 shows a side view of a sheet 2 prior to the cutting operation. The deformation adds thickness to the edges of the cut in the form a ridge 4, as seen in FIG. 2 after the cutting operation.

Figure 3:
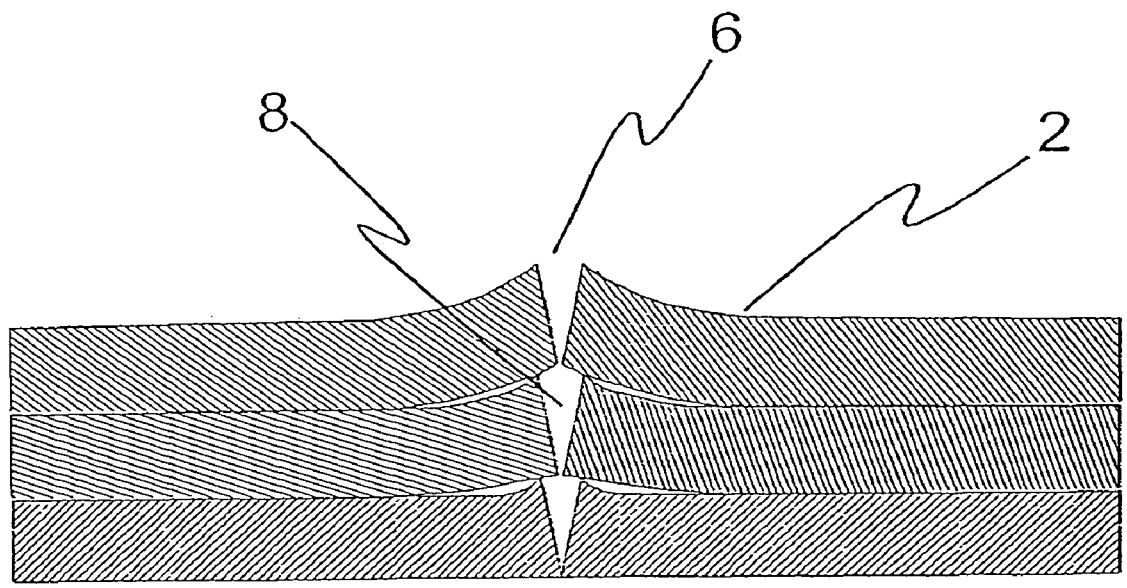
FIG. 3 is a cut-away schematic side view of a stack of sheets, showing a cumulative effect at a contour cut.

Attaching and adhering a plurality of sheets which have contoured cuts located one directly on top of the other causes the accumulation of the added thickness of the deformed edges as seen in FIG. 3. This accumulation of ridges 6 may become great enough to prevent adequate attachment of the layers near the cut edge and air 8 may become trapped between the successive sheets. This phenomenon causes the surface of the sheet to loose its planarity, damages the strength of adhesion between layers and weakens the model especially in places where fine details are built. When the ridges become high enough, they interfere sufficiently with the addition of new layers and it may become impossible to continue building the model.

It should be noted that in the following discussion, in the embodiments which mechanically link the deformation reduction mechanism to the cutting apparatus, it is understood that the required movement over the top surface of the sheet is supplied by the computerized drive system for similarly moving the cutting apparatus described in WO9934976. In the embodiments that are not mechanically linked to the cutting apparatus, the movement of the deformation reduction mechanism may be supplied by a corresponding drive system similar to that used to move the cutting apparatus. Further, the deformation reduction mechanisms discussed herein within the context of being mechanically linked to the cutting apparatus, need not be so linked, required movement along the line of the contour cut may be provided by a drive system as mentioned above. That is to say, each of the mechanisms may be configures as interchangeable heads with which one drive system may interconnect as required during the three-dimensional model building process. Alternatively, a separate deformation reduction drive system may be added to the model building system. The separate deformation reduction drive system may be configured with interchangeable heads or a fixed head.

Figure 4:
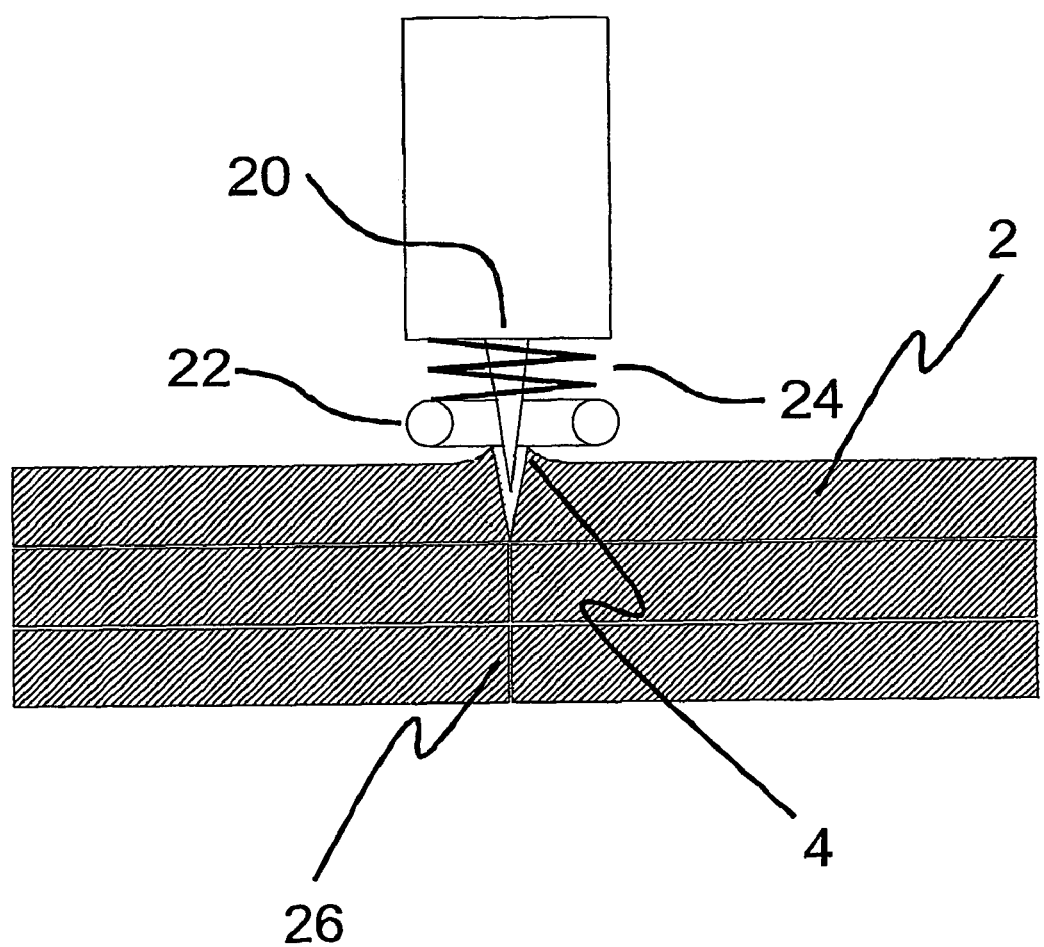
FIG. 4 is a cut-away schematic side view of a first preferred embodiment of a mechanically linked cutting apparatus and deformation reduction mechanism constructed and operative according to the teachings of the present invention, shown here with a single annular deformation reduction component.

Turning now to the preferred embodiments of the present invention, FIG. 4 shows a first preferred, embodiment of a mechanically linked cutting element and deformation reduction mechanism. The movement of the cutting apparatus and the deformation reduction mechanism is controlled by a processing unit which moves the contour-cutting element along a contour line so as to cut out a "slice" of the model being built. Here, the contour-cutting element 20 is substantially circumscribed by a spring 24 biased annular deformation reduction component 22, which is mounted on the cutting apparatus. The force of the spring presses the deformation reduction component against the ridge 4 thereby pressing the sheet material toward the surface of the sheet. It is intended that the portion of the sheet that forms the ridge will be displaced into the void caused by the cut, as illustrated here by the cut 26 in the previous sheets. Since the deformation reduction component circumscribes the contour-cutting element it will make contact with the ridge as the contour-cutting element moves in any direction while making the necessary contour cut. As the contour-cutting element comes to the end of the required contour cut, it is preferable for the contour-cutting element to be withdrawn to a non-cutting position and the cutting apparatus continue to move until the deformation reduction component has passed over substantially the entire length of the contour cut. While it may be, preferable for the deformation reduction component to be annular in shape, it may be implemented in any form that substantially circumscribes the contour-cutting element. Further, the deformation reduction component may have any desired cross-sectional shape.

Figure 5:
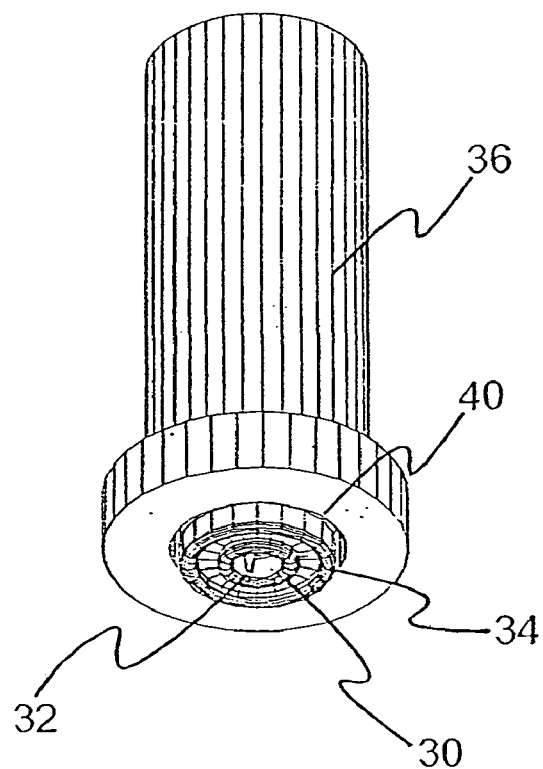
FIG. 5 is a perspective schematic view of a second preferred embodiment of a mechanically linked cutting apparatus and deformation reduction mechanism constructed and operative according to the teachings of the present invention, shown here with an annular stabilization element circumscribing an annular deformation reduction component and the contour-cutting element in a non-cutting position.
Figure 6:
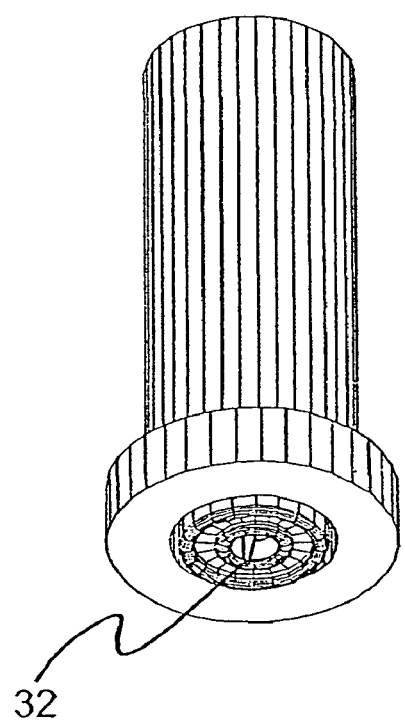
FIG. 6 is a perspective schematic view of the embodiment of FIG. 5 showing the contour-cutting element projected to a cutting position.

FIG. 5 illustrates a second embodiment of a mechanically linked cutting element and deformation reduction mechanism such that the deformation reduction mechanism is mounted on the cutting apparatus. In this embodiment, the deformation reduction component 30, which circumscribes the contour-cutting element 32, is itself circumscribed by a stabilization element 34. A spring (not shown) which biases the deformation reduction component toward the top surface of the sheet being cut is located in the housing 36. Here too, as the contour-cutting element 32 comes to the end of the required contour cut, it is preferable for the contour-cutting element to be withdrawn to a non-cutting position, as illustrated in FIG. 5, and the cutting apparatus continue to move until the deformation reduction component has passed over substantially the entire length of the contour cut. A preferred contour-cutting element utilized in this embodiment is a cutting blade that connected to the cutting apparatus so as to swivel about an axis substantially perpendicular to the plane of the planar surface upon which the stack is being constructed. It should be noted, however, that the contour-cutting element may be implemented, by non-limiting example, as a cutting stylus, or blade that is mechanically rotated as required. Further, any of these contour-cutting elements may be implemented in any or all of the embodiments of the present invention.

Figure 9:
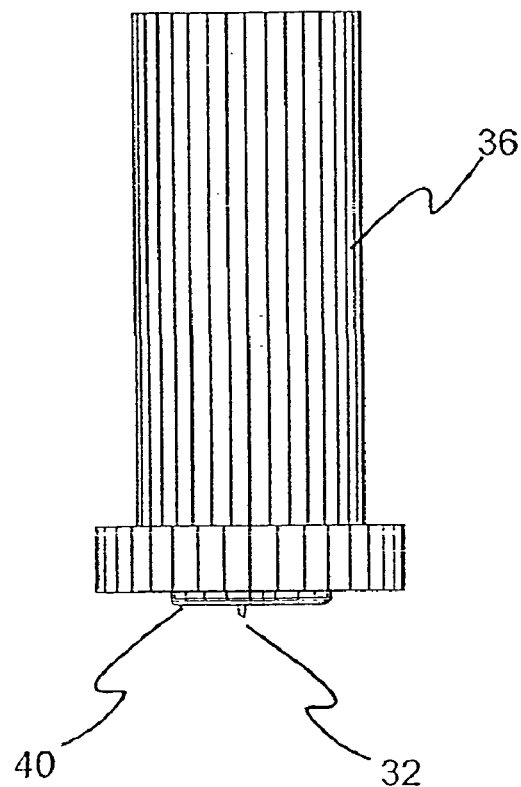
FIG. 9 and FIG. 10 are schematic side views of FIG. 5 and FIG. 6 respectively.
Figure 10:
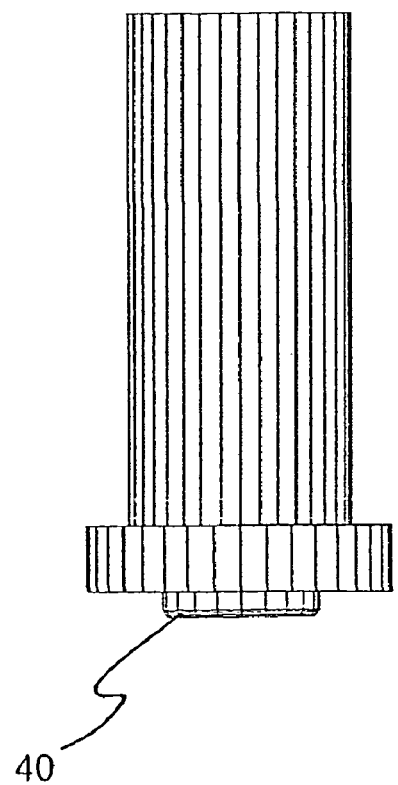

In operation, before the cutting apparatus is deployed on the top surface of the sheet the deformation reduction component 40 extends below the bottom of the cutting apparatus case as shown in FIG. 9. As the cutting apparatus is lowered to the top surface of the sheet, the deformation reduction component 36 contacts the sheet (not shown). As the cutting continues to move toward the top surface of the sheet, the case 36 partially envelopes the deformation reduction component 40 and the contour-cutting element is projected to a cutting position, as illustrated in FIG. 10. Conversely, at the end of the cutting process, the cutting apparatus is lifted from the surface of the sheet, the spring biased deformation reduction component 40 extends further from the housing 36, thereby maintaining contact with the ridge while the cutting apparatus continues to move and the deformation reduction component has passed over the entire length of the contour cut.

Figure 7:
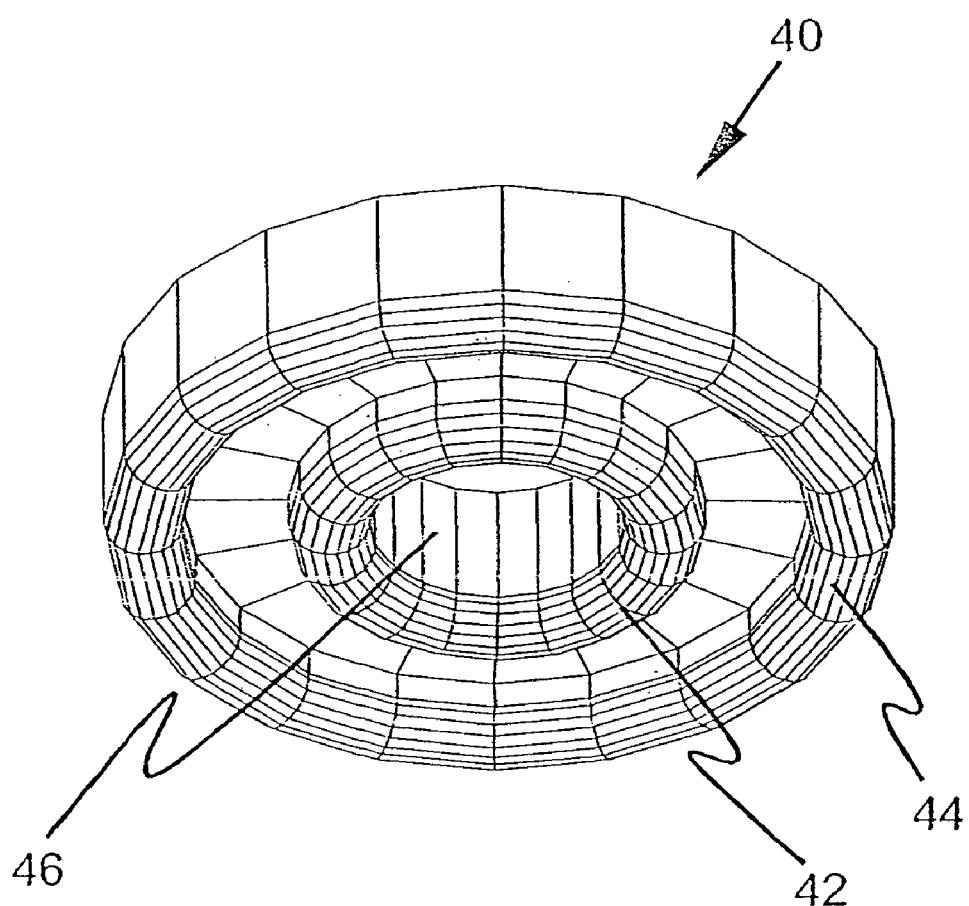
FIG. 7 is a perspective schematic view of an annular deformation reduction component circumscribed by an annular stabilization element constructed and operative according to the teachings of the present invention.
Figure 8:
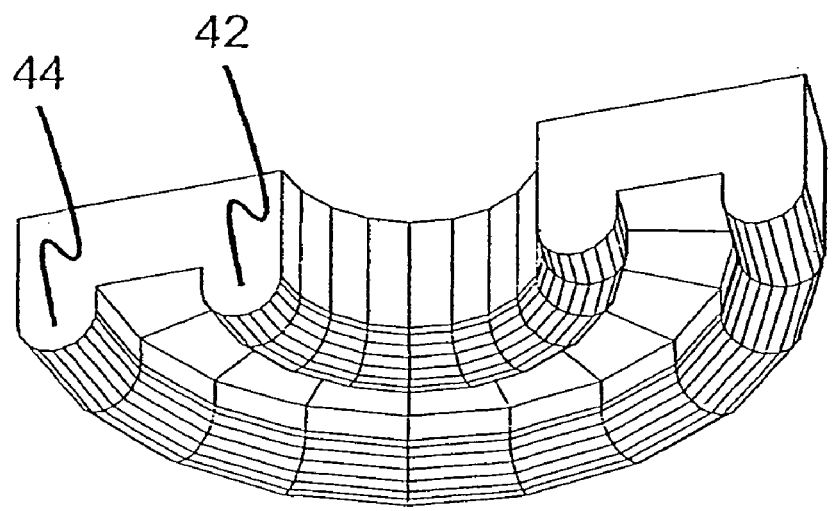
FIG. 8 is a cross-sectional view of FIG. 7.

FIG. 7 shows the deformation reduction component and stabilization element formed as a single element, generally referred to as 40, the contact surfaces 42 and 44 which represent two concentric substantially annular rings, the cross-section of which is shown in FIG. 8. Although the two annular rings are co-planar, pressure is applied to the ridge primarily by the interior deformation reduction component This occurs due to the ridge being formed by the contour-cutting element which is located within the annulus of the deformation reduction component. Thus, as the cutting apparatus moves, the ridge comes in contact first with the deformation reduction component, by the time the stabilization element passes over the contour cut, the ridge has been substantially reduced. The two substantially annular rings, in turn, circumscribe the opening 46 through which the contour-cutting element is projected and withdrawn. Although the discussion above is with regard to a deformation reduction component 40 that moves relative to the cutting apparatus housing 36 and fixed contour-cutting element 32, an alternative embodiment may be configured with a contour-cutting element 32 that moves relative to an interconnected cutting apparatus housing 36 and fixed deformation reduction component 40. It should be noted that the deformation reduction component and the stabilization element may be formed as separated elements that are mechanically linked to each other directly or they may be mechanically linked through other associated elements.

Figure 11:
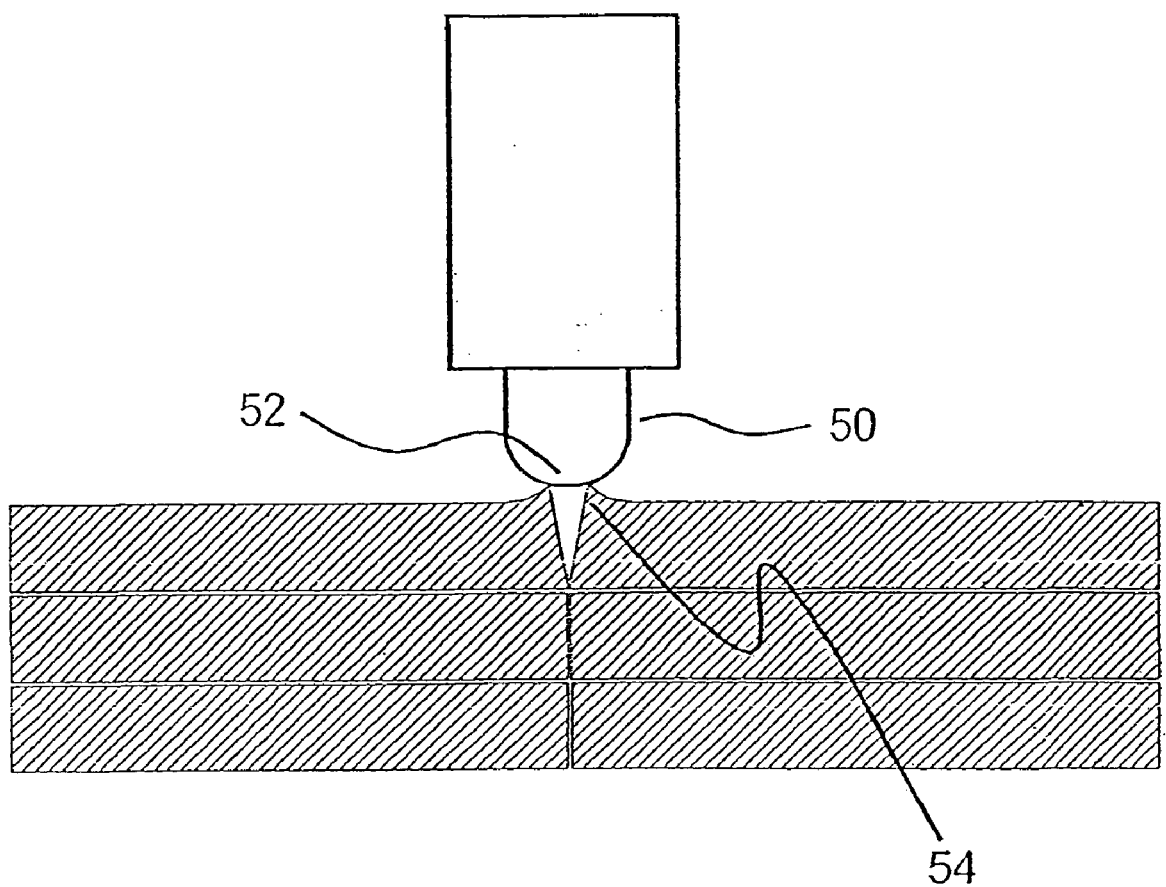
FIG. 11 is a cut-away schematic side view of a first preferred embodiment of a deformation reduction mechanism with a partially spherical pressure application extension tip constructed and operative according to the teachings of the present invention.

In the preferred embodiment of FIG. 11, the deformation reduction component is implemented as a pressure application extension 50 with a partially spherical tip 52 which applies pressure to the deformation ridge 54. The tip of the pressure application extension may be of any suitable shape.

Figure 12:
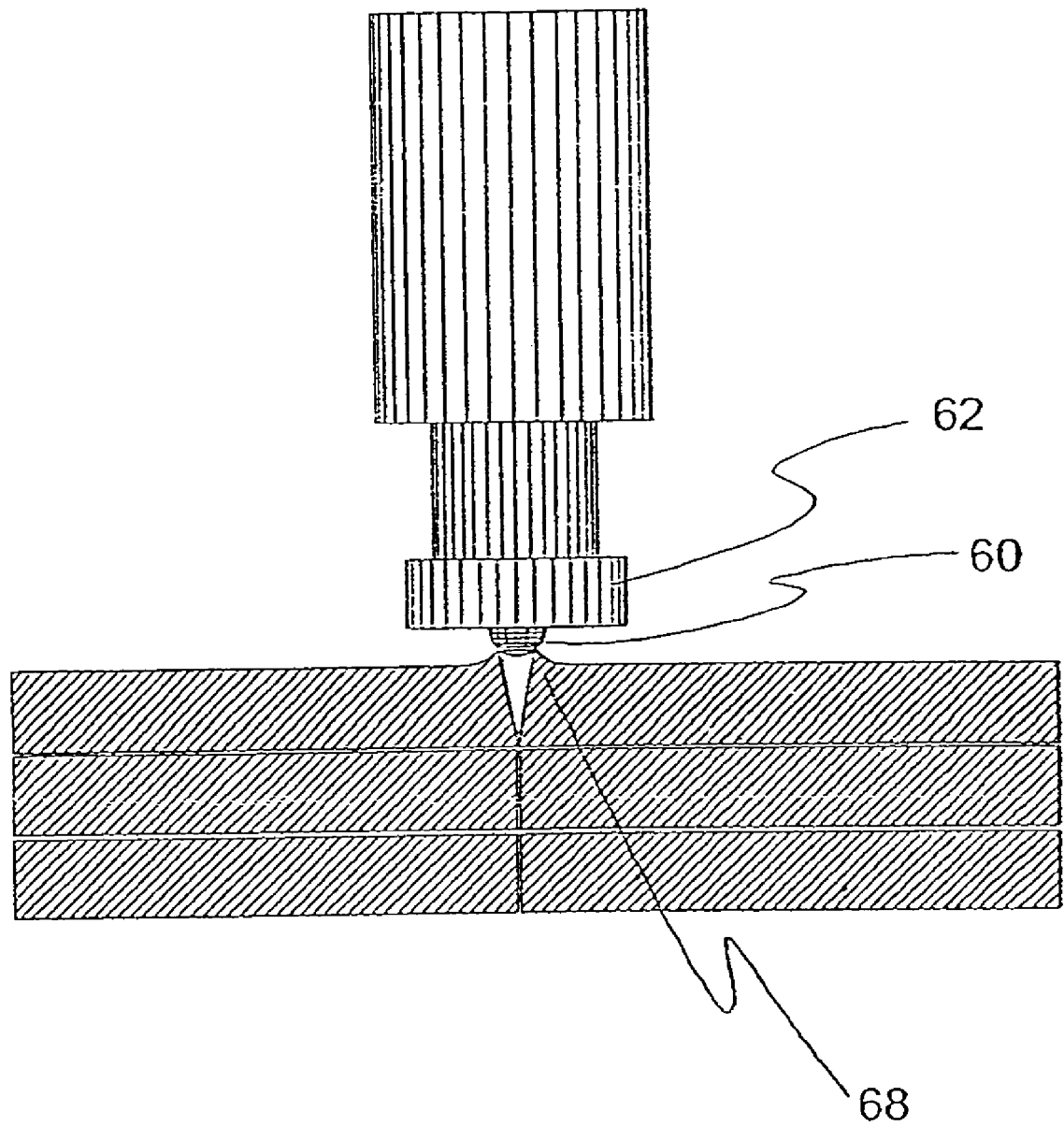
FIG. 12 is a partially cut-away schematic front view of a second preferred embodiment of a deformation reduction mechanism with a partially spherical pressure application extension tip constructed and operative according to the teachings of the present invention.
Figure 13:
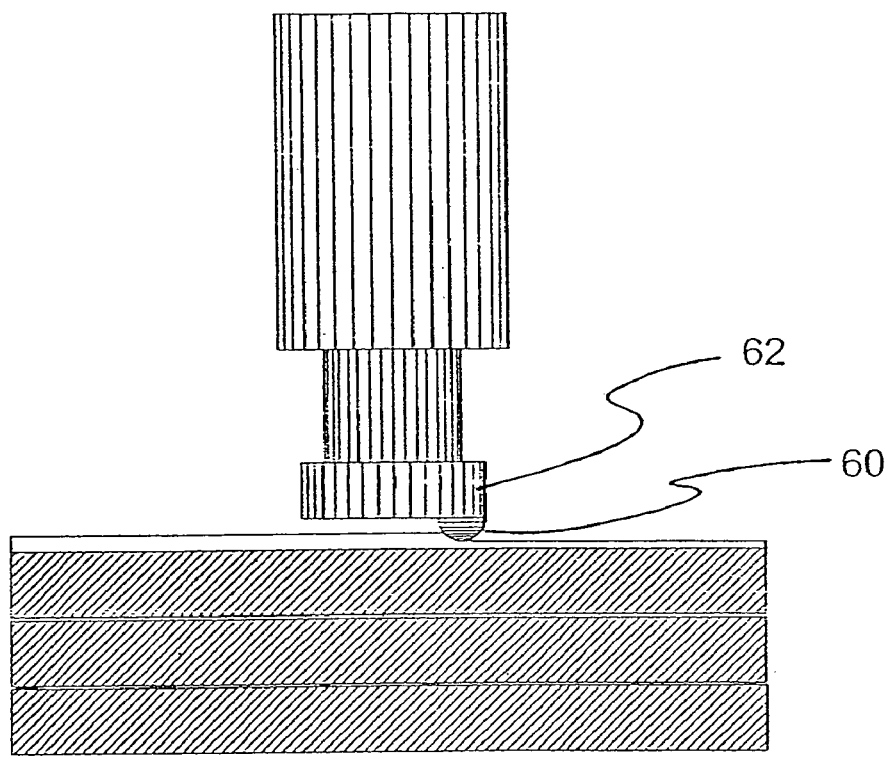
FIG. 13 is a partially cut-away side view of the embodiment of FIG. 12.
Figure 14:
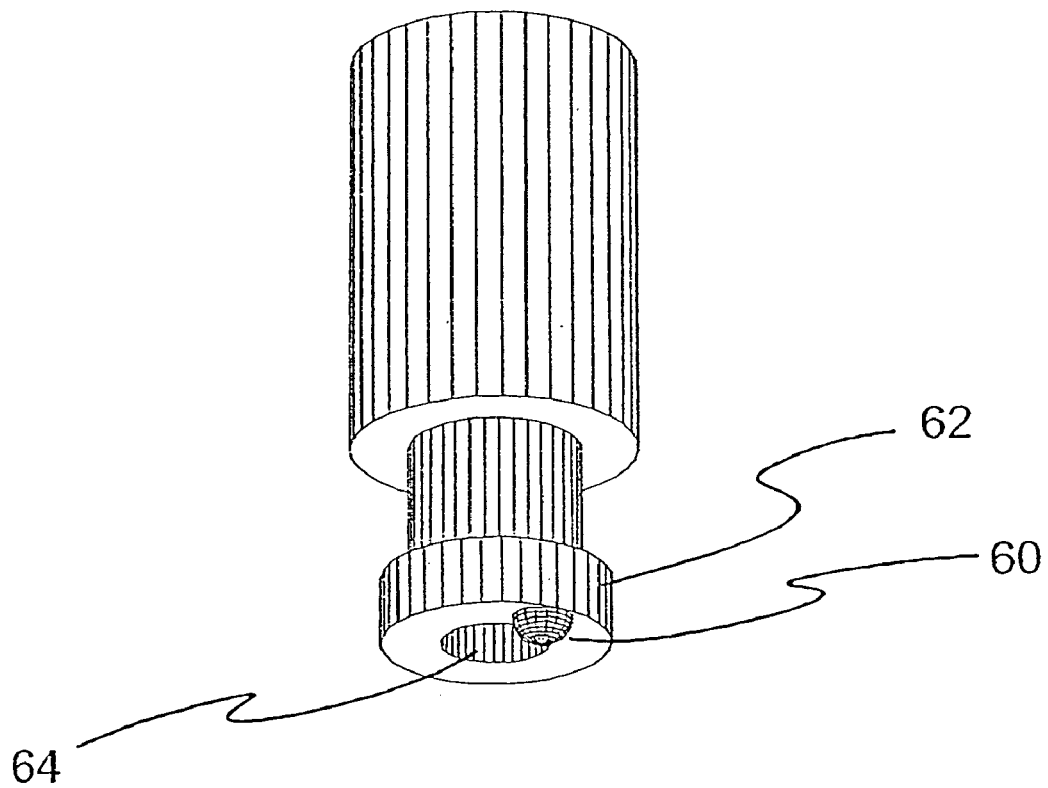
FIG. 14 is a perspective view of the embodiment of FIG. 12.
Figure 15:
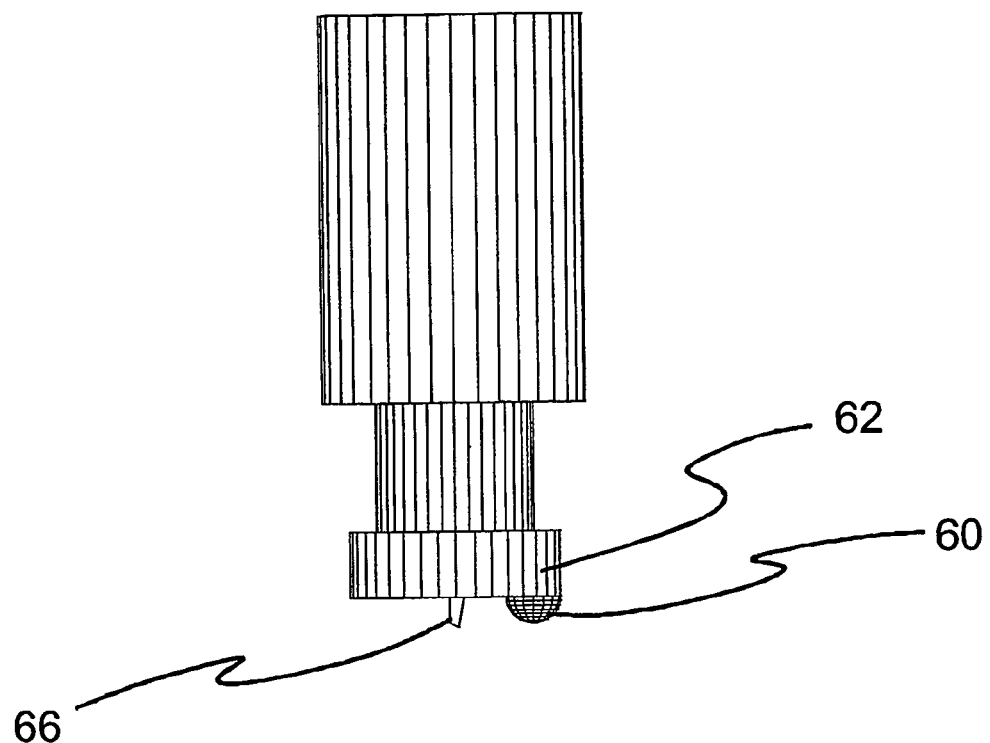
FIG. 15 is a schematic side view of a third preferred embodiment of a mechanically linked cutting apparatus and deformation reduction mechanism constructed and operative according to the teachings of the present invention, shown here the cutting apparatus is linked to the deformation reduction mechanism of FIG. 12.
Figure 16:
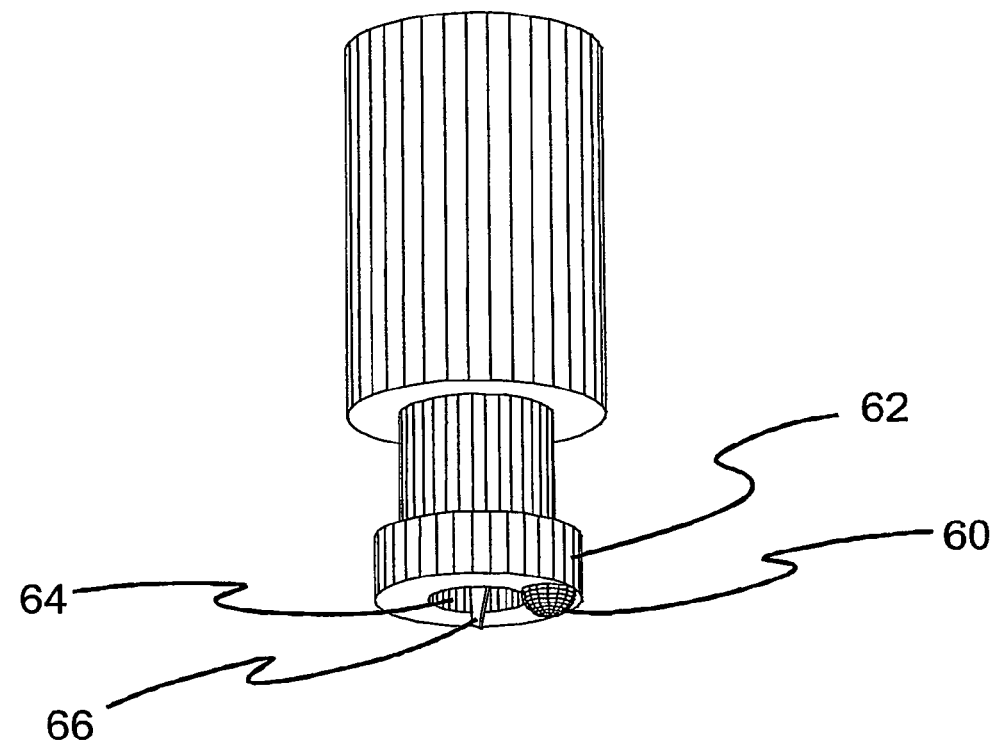
FIG. 16 is perspective schematic view of the embodiment of FIG. 15.

The alternative pressure application extension 60 of FIG. 12 extends from a circular support base 62. As seen in FIGS. 13 and 14, the pressure application extension is located adjacent to the peripheral edge of the circular base providing space for an opening 64 though which a contour-cutting element 66 (FIGS. 15 and 16) may be projected and withdrawn. Here too, the deformation reduction mechanism is mounted on the cutting apparatus. The support base is rotatable about an axis substantially perpendicular to the top surface of the sheet being cut so that as the cutting apparatus moves the contour-cutting element along the line of the contour cut, the pressure application extension trails behind the contour-cutting element and follows the line of the contour cut. That is, when the contour-cutting element changes directions, in order to follow the line of the contour cut, the support base rotates as needed so as to keep the pressure application extension on the ridge 68. Rotation may be actuated by a motor and gear assembly similar to that discussed below with regard to FIG. 18.

It should be noted that the deformation reduction components of the present invention need not be spring biased. The deformation reduction component may be configured such that the weight of the component itself supplies sufficient downward force.

Figure 17:
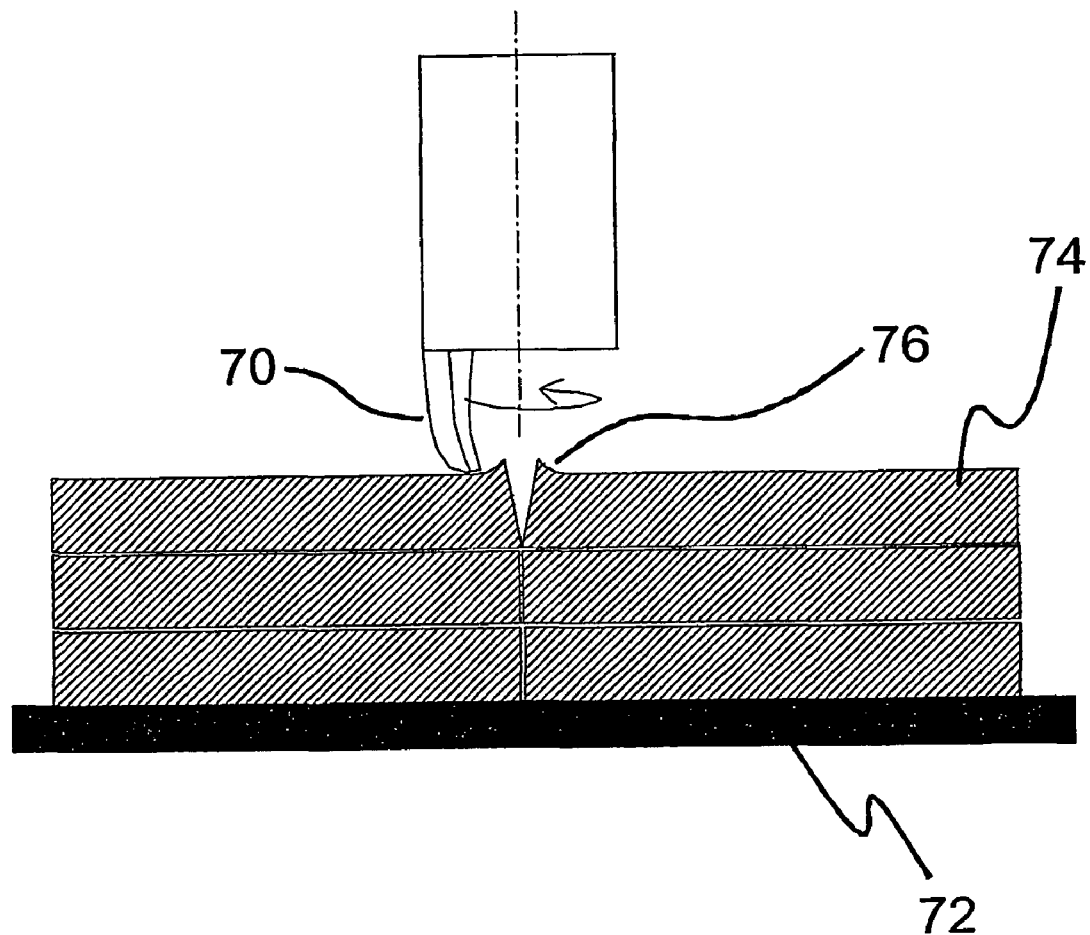
FIG. 17 is a cut-away schematic side view of a first preferred embodiment of a planing tool with a rotation blade constructed and operative according to the teachings of the present invention.

The deformation reduction mechanism of FIG. 17 is a planing tool with a continuously revolving blade 70. The cutting plane of the planing tool is substantially parallel to the planar surface 72 upon which the stack of sheets 74 is being constructed, and substantially coincident with the top surface of the sheet being cut. The axis of revolution of the blade is substantially perpendicular to the planar surface 72. As the deformation reduction mechanism follows the line of the contour cut, the revolving blade cuts away any protruding ridge 76 caused by the contour cutting process.

Figure 18:
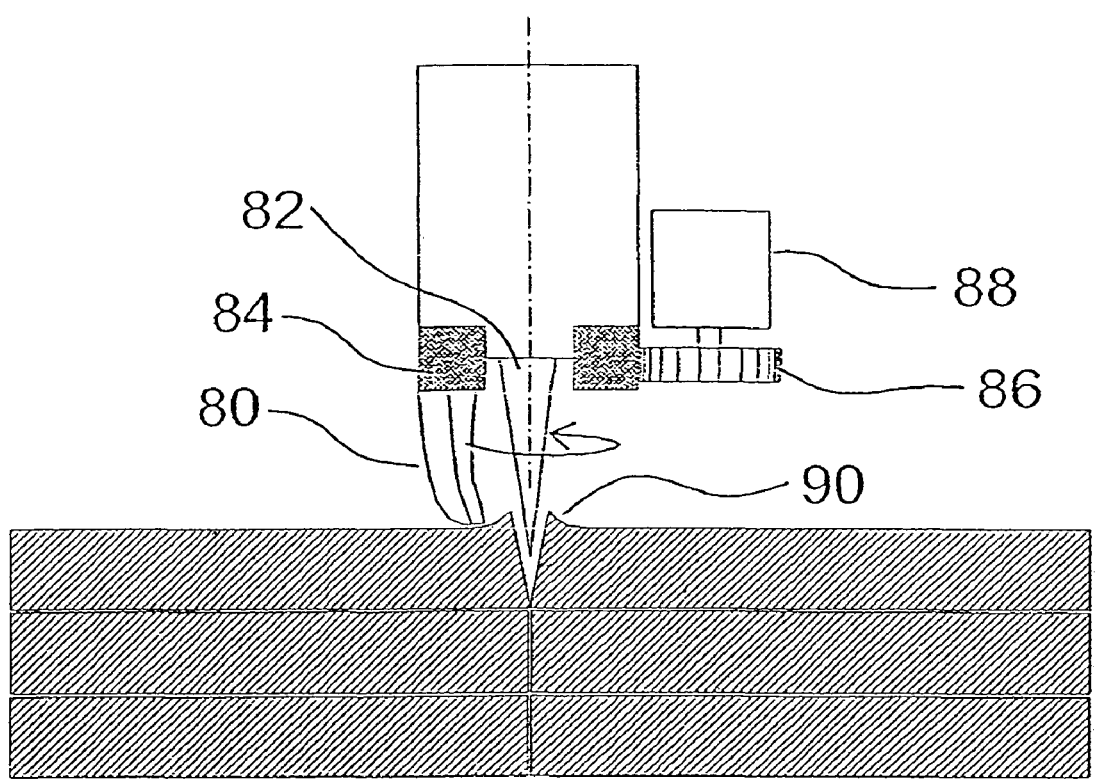
FIG. 18 is a cut-away schematic side view of a fourth preferred embodiment of a mechanically linked cutting apparatus and deformation reduction mechanism constructed and operative according to the teachings of the present invention, shown here the cutting apparatus is planing tool with a revolving blade.

The planing tool of FIG. 18 is mechanically linked to the contour-cutting element so as to be mounted on the cutting apparatus. As above, the cutting plane of the planing tool is substantially parallel to the planar surface upon which the stack of sheets is being constructed, and substantially coincident with the top surface of the sheet being cut. The axis of revolution of the blade is substantially perpendicular to the planar surface. The substantially circular path of the blade 80 circumscribes the contour-cutting element 82. The preferred embodiment illustrated here provides rotational force from motor 88 through gear 86 to the rotating base 84 upon which the blade 80 is fixed. Parenthetically, it should be noted that a motor and gear assembly such as this may be used to provide the needed rotation for the circular support base of the embodiment discussed with regard to FIGS. 12–16.

In operation, as the cutting apparatus moves the contour-cutting element along the line of the contour cut, the blade revolves around the contour-cutting element and cuts away any portion of The protruding ridge 90 that may be caused by the contour cutting process. It should be noted that the planing tool may be implemented as a modification of various devices including, but not limited to, routers, machining tools, and planers. The blade, too, may be implemented in a variety of forms including, but not limited to, a single blade, a plurality of blades following a single circular path, a rasping tool, and an abrasive surface, such as, but not limited to sand paper. The abrasive surface and the rasping tool may include continuous or intermittent cutting surfaces. Further, the blade need not revolve. An embodiment similar to that described with regard to FIGS. 12–16 may be implemented with a fixed blade replacing the pressure application extension.

Figure 19:
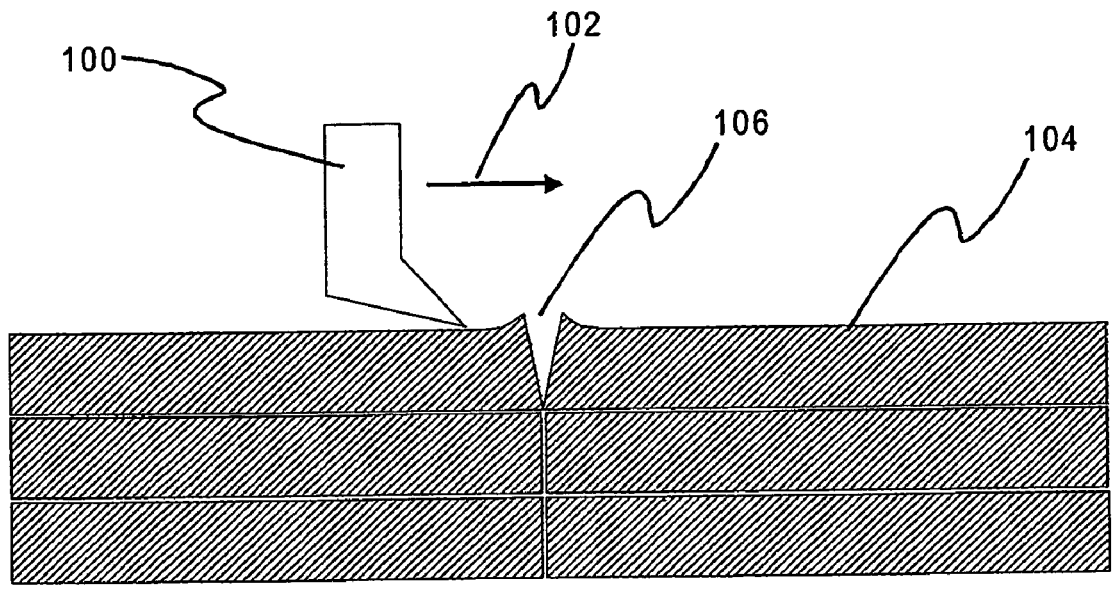
FIG. 19 is a cross-sectional view of a planing tool constructed and operative according to the teachings of the present invention, with a fixed planing blade that spans the width of the planing area.

The planing tool of FIG. 19 is configured as a single planing blade 100 which spans a portion of a first dimension, referred to herein as width, of the working area of the three-dimensional model building apparatus. It is preferable for the planing to span the width of the sheet being cut, however, this need not be the case, the planing blade may longer or shorter than the width of the sheet. During the contour cutting process, the planing tool is positioned so as not to interfere with the cutting apparatus. After the cutting process is completed, the planing tool moves the planing blade in the direction of a second dimension 102, referred to herein as length, of the working area of the three-dimensional model building apparatus. The planing tool has a cutting plane that is substantially parallel to the planar surface upon which the stack of sheets is being constructed, and substantially coincident with the top surface 104 of the sheet being cut. As the planing blade move across the top surface of the sheet, portions of the ridge 106 that protrude above the cutting plane are substantially cut away.

Figure 20:
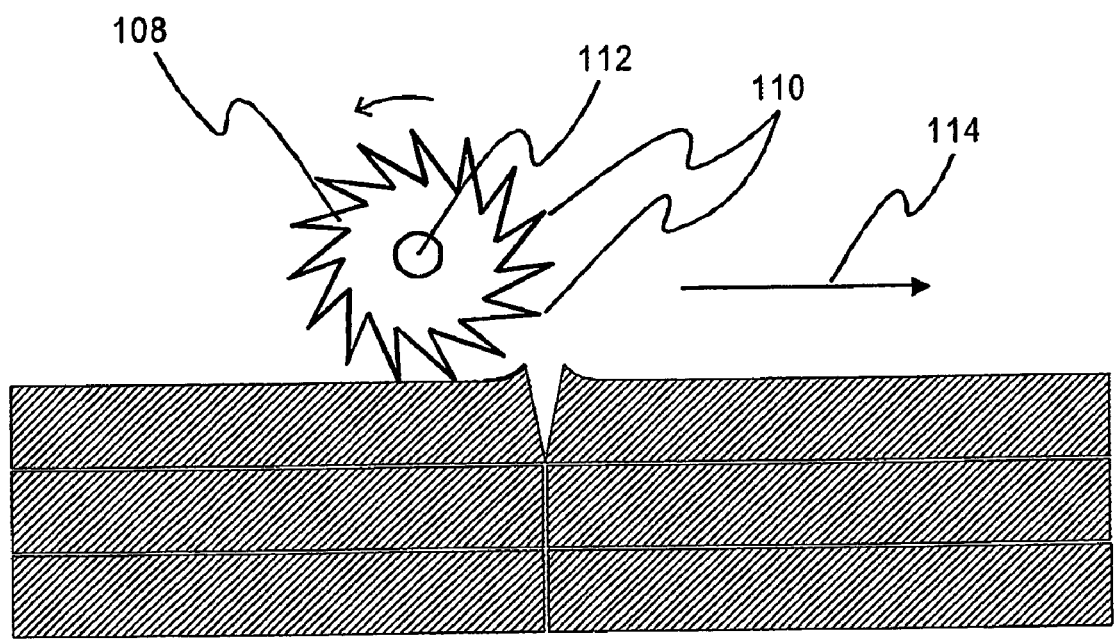
FIG. 20 is a cross-sectional view of a planing tool constructed and operative according to the teachings of the present invention, with a plurality of revolving planing blades that span the width of the planing area.
Figure 21:
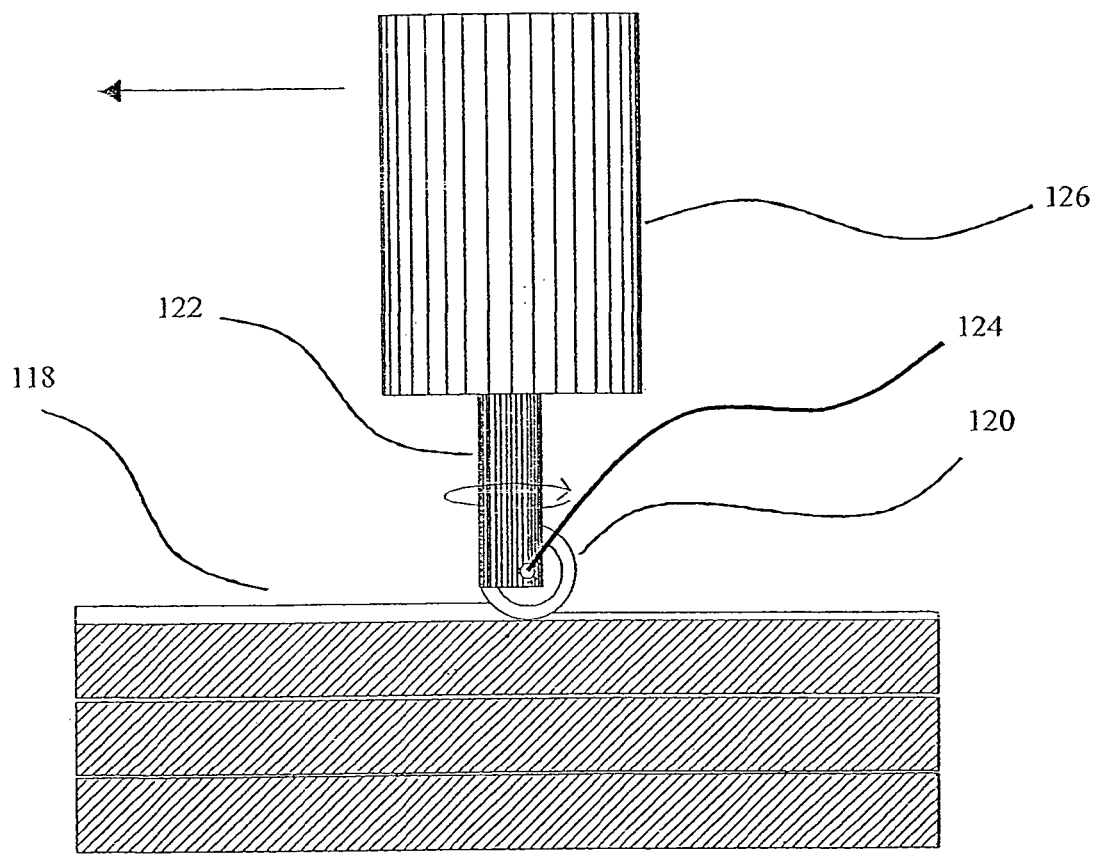
FIG. 21 is a schematic side view of a deformation reduction mechanism constructed and operative according to the teachings of the present invention, with a swivel-wheel deformation reduction component.

An alternative planing blade is illustrated in FIG. 20. Here, a substantially cylindrical element 108, which spans preferably the width of the sheet, is configured with a plurality of planing blades 110. The blades revolve about axis 112 as the planing tool moves across the length of the sheet. As illustrated, the planing blades rotate such that at the point of contact with the sheet, the blade is moving in the same direction 114 as the planing tool. It should be noted that configuration of the blades for cutting and rotation in the opposite direction is within the intentions of the present invention. Further, the revolving blades may be configured as a single blade or a plurality of blades. The blades may be integral to or mounted on a cylindrical element or the blades may span a number of cylindrical supports spaced along the length of the blades. Also, the embodiments discussed with regard to FIGS. 19 and 20 may span the length and move across the width of the working area of the model building The swivel-wheel deformation reduction mechanism of FIG. 21 applies pressure to the ridge 113 with a wheel 120 that is attached to the pressure application extension 122 by the axle 124. The wheel rotates about an axis that is substantially parallel to the top surface of the sheet, thereby rolling substantially along the ridge 113. The pressure application extension 122 is rotatably attached to the deformation reduction mechanism 126 so as to rotate about an axis that is substantially perpendicular to the axis of wheel rotation. Thus, the wheel is allowed to swivel in order to follow any change direction of the path of the deformation reduction mechanism as the line of the contour cut is followed. As mentioned above, downward pressure may be supplied by a spring element located inside the deformation reduction mechanism.

Figure 22:
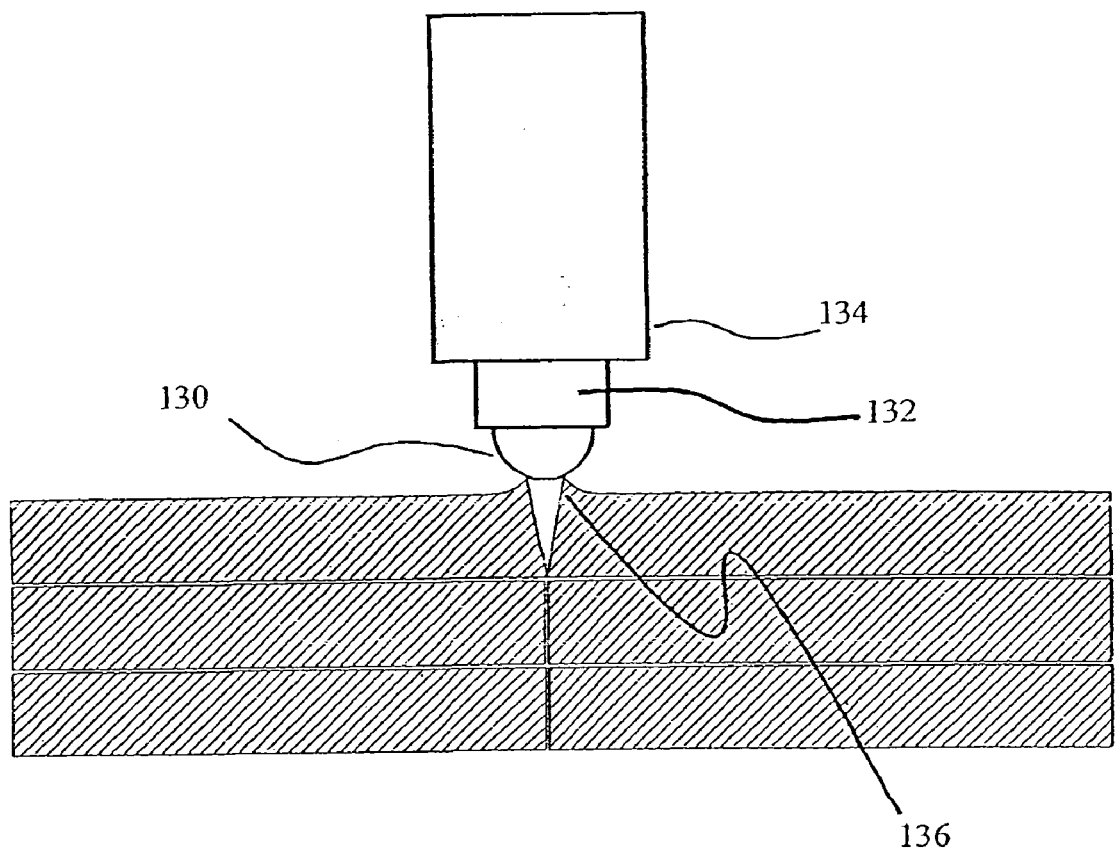
FIG. 22 is a cut-away schematic side view of a deformation reduction mechanism constructed and operative according to the teachings of the present invention, with a rolling-ball deformation reduction component.

FIG. 22 shows a preferred embodiment of a deformation reduction mechanism that applies pressure to the ridge 136 with a rolling-ball. Here, the substantially spherical deformation reduction component 130 is housed in the pressure application extension 132 of the deformation reduction mechanism 134. The pressure application extension 132 is configured to allow the spherical pressure deformation reduction component 130 omnidirectional rotation. Here too, the deformation reduction component may be biased toward the top surface of the sheet by a spring that applies pressure to the pressure application extension. The spring may be housed inside the deformation reduction mechanism 134.

It will be appreciated that the above descriptions are intended only to serve as examples, and that many other embodiments are possible within the spirit and the scope of the present invention.

What is claimed is:

1. A method for reducing deformation along a contour cut, for use in a system for constructing a three-dimensional object out of a plurality of sheets, the deformation being a result of a cutting process whereby a ridge of sheet material forms along the contour cut, the ridge protruding above a top surface of the sheet, the method comprising:
   a) bonding at least a portion of an additional sheet to a top sheet of a stack of at least partially bonded together cut sheet, said additional sheet having a substantially planar top surface;
   b) moving a contour-cutting element along a contour line so as to make at least one contour cut through at least the top sheet of the stack;
   c) moving a deformation reduction component so as to follow the contour cut after said contour-cutting element has made at least a portion of the contour cut so as to substantially restore planarity of said planar top surface of said additional sheet: and
   d) repeating steps a–c until the three-dimensional object is completed.

2. The method of claim 1, wherein the steps of moving said contour-cutting element and moving said deformation reduction component are preformed by said contour-cutting element and said deformation reduction component mechanically linked such that said contour-cutting element and said deformation reduction component are deployed substantially simultaneously.

3. The method of claim 1, wherein said deformation reduction component is biased toward the top surface of the sheet thereby applying pressure to the ridge.

4. The method of claim 3, wherein said applying pressure to the ridge is preformed using a deformation reduction component configured as an annular element.

5. The method of claim 4, wherein the steps of moving said contour-cutting element and moving said deformation reduction component are preformed by said contour-cutting element and said deformation reduction component mechanically linked such that said annular element substantially circumscribes said contour-cutting element.

6. The method of claim 5, further comprising withdrawing said contour-cutting element to a non-cutting position and continuing movement of said deformation reduction component, thereby passing a portion of said annular element over substantially an entire length of the contour cut.

7. The method of claim 6, further comprising circumscribing said deformation reduction component with an annular stabilization member.

8. The method of claim 3, wherein said applying pressure to the ridge is preformed using a deformation reduction component configured with a partially spherical pressure application tip.

9. The method of claim 8, wherein the steps of moving said contour-cutting element and moving said deformation reduction component are preformed by said contour-cutting element and said deformation reduction component mechanically linked such that said pressure application tip substantially trails said contour-cutting element while said contour-cutting element is making said at least one contour cut, thereby moving said pressure application tip along said contour line.

10. The method of claim 9, further comprising withdrawing said contour-cutting element to a non-cutting position and continuing movement of said deformation reduction component, thereby passing said pressure application tip over substantially an entire length of the contour cut.

11. The method of claim 3, wherein said applying pressure to the ridge is preformed using a deformation reduction component configured as a wheel that rotates about an axis that is substantially parallel to the top surface of the sheet said wheel being further configured so to as swivel about an axis that is substantially perpendicular to the top surface of the sheet.

12. The method of claim 3, wherein said applying pressure to the ridge is preformed using a deformation reduction component configured as an omnidirectional rotating sphere.

13. The method of claim 1, further comprising cutting away portions of the ridge.

14. The method of claim 13, wherein said cutting away is preformed by using said deformation reduction component configured with a blade that revolves substantially constantly about an axis substantially perpendicular to a stacking surface upon which the stack is being constructed, said deformation reduction component having a cutting plane that is substantially parallel to said stacking surface and substantially coincident with the top surface of the sheet.

15. The method of claim 14, wherein the steps of moving said contour-cutting element and moving said deformation reduction component are performed by said contour-cutting element and said deformation reduction component mechanically linked such that said contour-cutting element is substantially circumscribed by a path of said revolving blade while said contour-cutting element is making said at least one contour cut.

16. The method of claim 15, further comprising withdrawing said contour-cutting element to a non-cutting position and continuing movement of said deformation reduction component, thereby passing said revolving blade over substantially an entire length of the contour cut.

17. A system for bonding together and cutting out portions of a plurality of sheets so as to construct a three-dimensional object, the system including a mechanism for reducing deformation along a contour cut, the contour cut being in a sheet that is currently the top sheet of a stack of at least partially bonded together cut sheets, the deformation being a result of the cutting process whereby a ridge of sheet material forms along the contour cut, the ridge protruding above a top surface of the sheet, the system comprising:
- a) an apparatus for bonding a portion of an additional sheet to a plurality of sheets so as to form the stack, said apparatus including a stacking surface upon which the stack is assembled, the top surface of the sheet being substantially planar and substantially parallel to said stacking surface;
- b) a cutting apparatus configured to move a contour-cutting element along a contour line so as to cut at least one contour cut through at least the top sheet of the stack; and
- c) a deformation reduction mechanism configured to move a deformation reduction component along the contour cut after said contour-cutting element has made at least a portion of the contour cut, wherein said deformation reduction component contacts the ridge so as to reduce protrusion of the ridge so as to substantially restore planarity of said substantially planar ton surface of said sheet.

18. The system of claim 17, wherein said deformation reduction mechanism mechanically links said deformation reduction component to said cutting apparatus such that said contour-cutting element and said deformation reduction component are deployed for use and re-deployed for non-use substantially simultaneously.

19. The system of claim 17, wherein the deformation reduction mechanism is configured to bias said deformation reduction component so as to apply pressure to a region of the deformation, thereby depressing the sheet material which forms the ridge toward the surface of the top sheet.

20. The system of claim 19, wherein said deformation reduction mechanism includes a spring configured to bias said deformation reduction component toward the top surface of the sheet.

21. The system of claim 19, wherein said deformation reduction component is at least one substantially annular element.

22. The system of claim 21, wherein said deformation reduction mechanism mechanically links said deformation reduction component to said cutting apparatus such tat said contour-cutting element is substantially circumscribed by said at least one substantially annular element.

23. The system of claim 22, wherein said contour-cutting element is mechanically linked to said cutting apparatus so as to be withdrawn to a non-cutting position alter completion of the contour cut and movement of said cutting apparatus is continued so as to pass a portion of said deformation reduction component over substantially an entire length of the contour cut.

24. The system of claim 22, wherein said deformation reduction mechanism further includes at least a substantially annular stabilization member which substantially circumscribes said deformation reduction component.

25. The system of claim 19, wherein said deformation reduction component is a tip of a pressure application extension.

26. The system of claim 25, wherein said tip is a substantially spherical element rotatably linked to said pressure application extension so as to rotate omnidirectionally.

27. The system of claim 25, wherein said tip is a wheel that rotates about an axis that is substantially parallel to the top surface of the sheet, said pressure application extension being configured so as rotate about an axis tat is substantially perpendicular to the top surface of the sheet.

28. The system of claim 25, wherein said deformation reduction mechanism mechanically links said deformation reduction component to said cutting apparatus such that said pressure application extension trails said contour-cutting element along the contour cut made by said contour-cutting element.

29. The system of claim 28, wherein said contour-cutting element is mechanically linked to said cutting apparatus so as to be withdrawn to a non-cutting position after completion of the contour cut and movement of said cutting apparatus is continued so as to pass said pressure application extension over substantially an entire length of the contour cut.

30. The system of claim 29, wherein said tip is partially spherical.

31. The system of claim 17, wherein said deformation reduction mechanism includes a planing tool configured to cut away portions of the ridge.

32. The system of claim 31, wherein said planing tool is a blade that revolves about an axis substantially perpendicular to said stacking surface, said planing tool having a cutting plane that is substantially parallel to said stacking surface and substantially coincident wit the top surface of the sheet.

33. The system of claim 32, wherein said planing tool and said cutting apparatus are mechanically linked such that a path of said revolving blade.

34. The system of claim 33, wherein said contour-cutting element is mechanically linked to said cutting apparatus so as to he withdrawn to a non-cutting position after completion of the contour cut and movement of said deformation reduction mechanism is continued so as to pass said planing tool over substantially an entire length of the contour cut.

\* \* \* \* \*